(12) United States Patent
Peters et al.

(10) Patent No.: US 9,630,273 B2
(45) Date of Patent: Apr. 25, 2017

(54) WORKPIECE EDGE DETECTION USING PLASMA ARC CUTTING SYSTEM

(71) Applicant: Hypertherm, Inc., Hanover, NH (US)

(72) Inventors: John Peters, Canaan St., NH (US); Richard Adams, Norwich, VT (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/173,537

(22) Filed: Jun. 3, 2016

(65) Prior Publication Data
US 2016/0354856 A1    Dec. 8, 2016

Related U.S. Application Data

(60) Provisional application No. 62/170,991, filed on Jun. 4, 2015.

(51) Int. Cl.
*B23K 10/00* (2006.01)

(52) U.S. Cl.
CPC .......... *B23K 10/006* (2013.01); *B23K 10/00* (2013.01)

(58) Field of Classification Search
CPC ........ B23K 10/006; B23K 10/00; H05H 1/36; H05H 1/26; H05H 1/34
USPC ............ 219/121.39, 121.44, 121.59, 121.46, 219/121.55, 121.54
See application file for complete search history.

(56) References Cited

U.S. PATENT DOCUMENTS

| | | | |
|---|---|---|---|
| 4,795,882 A * | 1/1989 | Hardwick ............ | B23K 10/006 219/121.48 |
| 5,290,995 A * | 3/1994 | Higgins ............... | B23K 10/006 219/121.44 |
| 5,357,096 A * | 10/1994 | Koike ................. | B23Q 35/128 250/202 |
| 8,006,403 B2 | 8/2011 | Anderson | |
| 8,435,315 B2 * | 5/2013 | Tsangaris ................ | C10J 3/48 423/644 |
| 2010/0043244 A1 | 2/2010 | Anderson | |
| 2015/0146218 A1 | 5/2015 | Kerscher | |

FOREIGN PATENT DOCUMENTS

CN          203738242          7/2014

OTHER PUBLICATIONS

EtherCat Technology Group; "Technical Introduction and Overview EtherCAT—the Ethernet Fieldbus"; 10 pages, [retrieved on Jun. 3, 2016]. Retrieved from the Internet <URL: https://www.ethercat.org/en/technology.html>.
Operator's Manual; "HTA Rev 5.00 Operators Manual"; 198 total pages.

* cited by examiner

*Primary Examiner* — Mark Paschall
(74) *Attorney, Agent, or Firm* — Proskauer Rose LLP

(57) ABSTRACT

Systems and methods can be provided to use an automated cutting system to identify an edge or multiple edges of a workpiece. An automated cutting system receives trace data for a test path to be traced over a workpiece. The automated cutting system includes a torch from which gas is flowed. The torch is controlled in accordance with the trace data to trace the test path over the workpiece. A set of back pressure values are obtained by monitoring a back pressure of the gas during the tracing of the path. The back pressure values are mapped to a set of coordinates. An edge of the workpiece is identified using the set of back pressure values and the set of coordinates.

18 Claims, 3 Drawing Sheets

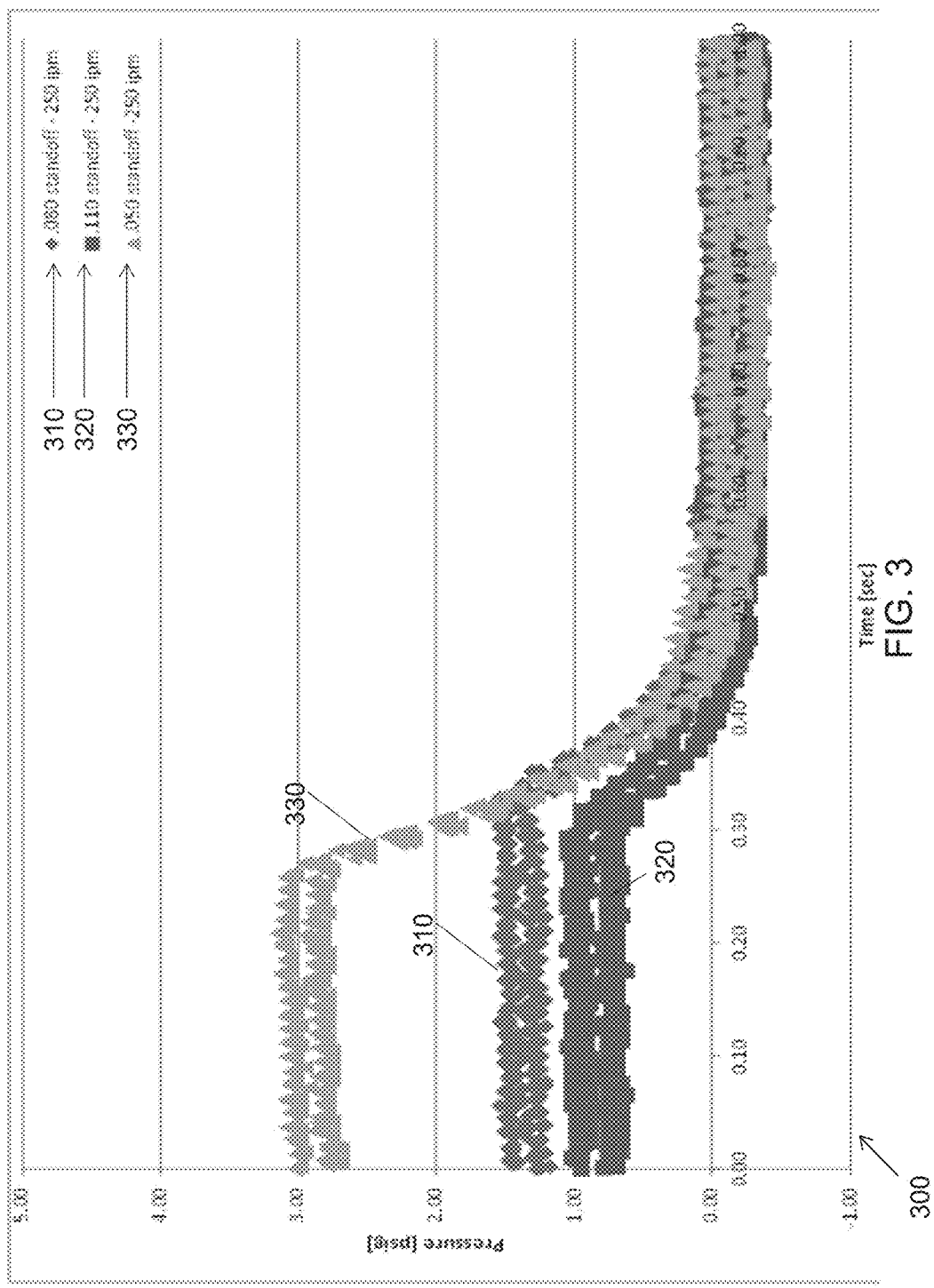

WORKPIECE EDGE DETECTION USING PLASMA ARC CUTTING SYSTEM

CROSS-REFERENCE TO RELATED APPLICATIONS

This application claims the benefit of and priority to U.S. Provisional Patent Application No. 62/170,991 filed on Jun. 4, 2015, which is owned by the assignee of the instant application and the contents of which are incorporated herein by reference in their entirety.

FIELD OF THE INVENTION

The subject matter of this application relates generally to systems and methods for detecting an edge of a workpiece or plate using an automated thermal processing system, such as a cutting system.

BACKGROUND

To efficiently utilize the material of a workpiece, such as a metal plate, edges of the workpiece mounted on a cutting table of an automated cutting system must be identified. Conventionally, the process of identifying the edges of a workpiece is performed manually, for example, with one or a team of operators positioning the plasma arc torch over an edge of the plate and entering that position point into a computer numerical control ("CNC") system. Several points are manually entered to define the edges of the workpiece, plate, or remnant to be cut. The CNC can then be used to orient a part program for processing the workpiece.

Other known techniques use an optical sensor to identify the edges of a workpiece. The optical sensor can be installed as a piece of additional equipment of an automated cutting system. Once installed, the optical sensor can be capable of detecting the edge of a workpiece.

Conventional methods of workpiece edge detection suffer from a number of shortcomings. The manual operator-based edge detection method is time-consuming and relies on visual feedback to identify the workpiece edge. The manual edge detection method can require multiple personnel and significant trial and error, in part because the distance between an operator's visual inspection of the plate edge and the operator inputs for the CNC system control can be great, especially for cutting tables having long lengths, for example, as long as 100 feet. This process is inefficient, expending unnecessary resources before the system can even make a cut. The potential for inaccuracies also creates a need to have an undesirably large scrap clearance at edges of a plate, detrimentally increasing the amount of waste remaining after conclusion of the cutting operation. Implementation of an optical sensor can be cost prohibitive and adds complexity to an automated cutting system, including additional equipment, controls, specialized setup requirements, and optical calibration and alignment. The use of an additional component can introduce an additional failure mode to an automated cutting system. Accordingly, there exists a need for an improved system or method for identifying edges or other features of a workpiece.

SUMMARY OF THE INVENTION

Systems and methods for workpiece edge detection are provided for an automated cutting system, such as a plasma cutting system. The workpiece edge detection methods and systems described herein can offer improved accuracy, faster alignment, and reduced complexity and cost over conventional methods and systems for edge detection. For example, the systems and methods for the detection of workpiece edges are capable of offering improved operation without the addition of costly additional equipment.

These advantages can be accomplished by using the automated cutting system to identify the edges of a workpiece without manual intervention and involvement. For example, the back pressure of a gas flowing from a torch can be monitored to identify edges of a workpiece as the torch is traced or moved over the workpiece. The systems and methods described herein can provide error reduction and limit the amount of waste material remaining after completion of a cutting or fabrication process. The systems and methods described herein can improve system efficiency and accuracy by reducing system downtime and providing a complete automated cutting solution through the use of the present technology. Improved accuracy that can be achieved by using the systems and methods described herein can enable a reduction in scrap clearance requirements, thereby reducing waste material.

In one aspect, there is a computer program product, tangibly embodied in a non-transitory, computer-readable storage device, for identifying an edge of a workpiece. The computer program product includes instructions operable to cause an automated cutting system to receive trace data for a test path to be traced over the workpiece, flow a gas from a torch of the automated cutting system, control the torch in accordance with the trace data to trace the test path over the workpiece, obtain a set of back pressure values by monitoring a back pressure of the gas during the tracing of the path, map the set of back pressure values to a set of coordinates, and identify an edge of the workpiece using the set of back pressure values and the set of coordinates.

In some embodiments, the gas is expelled from a shield line. In some embodiments, the gas expelled from the shield line includes air. The gas can include other gases such as oxygen, nitrogen, hydrogen, methane, argon, helium, air, and/or mixtures of these gases or another gas. In some embodiments, the back pressure is monitored by a pressure sensor on a plasma gas supply line. In some embodiments, the set of back pressure values and the set of coordinates are used to identify a plurality of edges. The computer program product can include instructions operable to cause an automated cutting system to identify all edges of a workpiece. In some embodiments, an automated cutting system uses the identified edge or edges to define a working area, which can be the area of the workpiece within which a torch can cut during a cutting operation without cutting over an edge of the workpiece. In some embodiments, the plurality of edges of the workpiece and a scrap clearance are used to determine a working area of the workpiece. In some embodiments, the scrap clearance can be two inches or less. It can be advantageous to reduce the scrap clearance to maximize material usage, which can result in cost savings.

In another aspect, there is a computer-implemented method for finding an edge of a workpiece with an automated cutting system. The method includes providing a computing device with trace data for a test path to be traced over a workpiece and flowing a gas from the torch of the automated cutting system. The method includes controlling the torch in accordance with the trace data to trace the test path over the workpiece. The controlling includes measuring a back pressure of the flowing gas during the tracing. The method includes converting the measured back pressure into a set of back pressure values, mapping the set of back pressure values to a set of coordinates, and analyzing the set of back pressure values and the set of coordinates to obtain a subset of coordinates representing an edge of the workpiece. In some embodiments, the gas is expelled from a shield line. In some embodiments, the gas expelled from the shield line includes air, or other gases such as oxygen, nitrogen, hydrogen, methane, argon, helium, air, and/or mixtures of these gases or another gas. In some embodiments, the back pressure is monitored by a pressure sensor on a plasma gas supply line. In some embodiments, the set of back pressure values and the set of coordinates are used to identify a plurality of edges. In some embodiments, the method includes defining a working area of the workpiece with reference to the plurality of edges and a scrap clearance. The scrap clearance can be less than or equal to 2 inches.

In some embodiments, the computing device comprises a deterministic network. The deterministic network can be, for example, a SERCOS network, a deterministic-based Ethernet network, an EtherCAT interface, FIREWIRE, and ModBus Communication protocol. Various components of the automated cutting system can be connected to the deterministic network, including, for example, valves, pressure sensors, such as a plasma gas supply line pressure sensor, or control and/or motion drive components for controlling and moving the torch of the automated cutting system. In some embodiments, the deterministic network can operate at speeds equal to or greater than about 4 Mbps, or equal to or greater than about 16 Mbps. A deterministic network, for example an EtherCAT network, can enable fast data sample rates, which can in turn enable accurate correlation of position information, pressure measurements, and/or other signals, to improve the precision with which a workpiece edge can be identified.

Other aspects, examples, and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the invention will be more fully understood from the following description of various embodiments, when read together with the accompanying drawings, in which:

FIG. 3 is a chart depicting representative pressure data measured by an automated cutting system practicing the invention, in proximity of an edge of a workpiece, in accordance with an embodiment of the invention.

DETAILED DESCRIPTION

Figure 1:
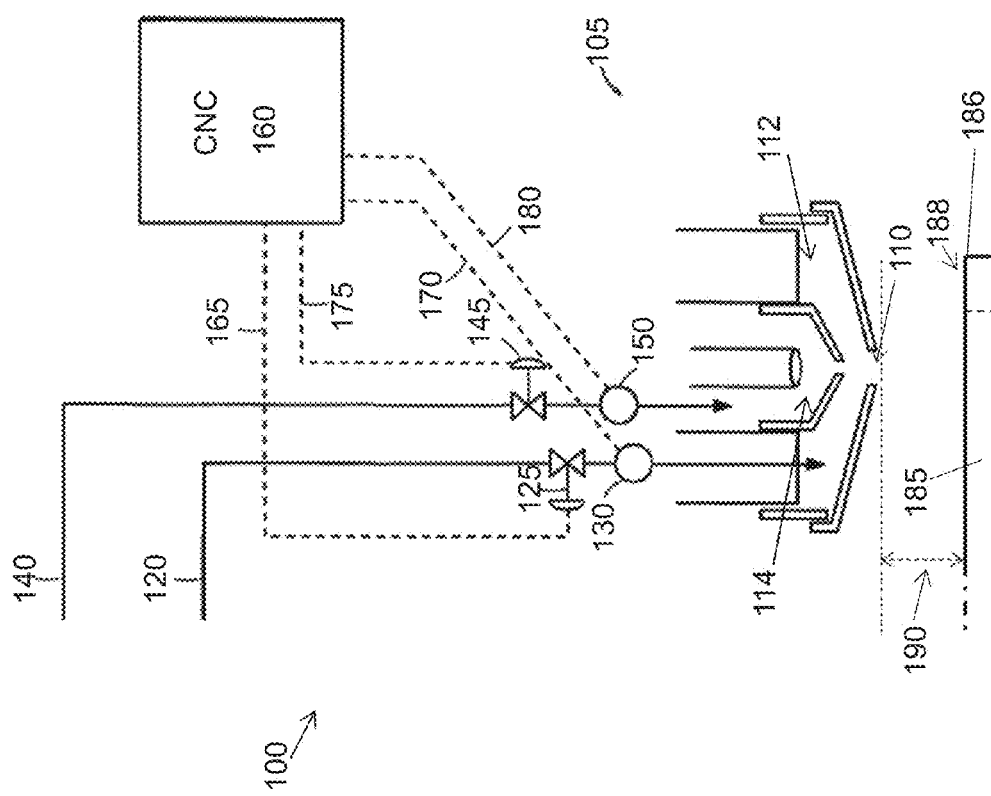
FIG. 1 illustrates a schematic representation of a torch configuration for an automated cutting system to identify edges of a workpiece, in accordance with an embodiment of the invention.

FIG. 1 illustrates a schematic representation of an exemplary torch configuration for an automated cutting system 100 to identify edges of a workpiece 185, in accordance with an embodiment of the invention. Automated cutting system 100 includes torch 105. Torch 105 includes torch tip 110. Torch 105 can take on a number of configurations and utilize a variety of different consumables, for example cutting, gouging, marking, or consumables with varied amperages, in accordance with embodiments of the invention. Shield gas supply line 120 feeds torch 105 with shield gas, for example, oxygen, nitrogen, hydrogen, methane, argon, helium, air, and/or mixtures of these gases or another gas from a source of shield gas (not shown). Shield gas supply line 120 can supply gas through shield gas supply line valve 125, which is located on shield gas supply line 120. Shield gas supply line pressure sensor 130 is disposed on shield gas supply line 120. Shield gas supply line pressure sensor 130 can be located between torch tip 110 and shield gas supply line valve 125. Plasma gas supply line 140 is capable of supplying torch 105 with plasma gas, for example oxygen, nitrogen, and/or argon. Plasma gas supply line 140 is capable of supplying gas from a source of plasma gas (not shown) through plasma gas supply line valve 145. Torch tip 110 can expel shield gas from shield gas supply line 120 or plasma gas from plasma gas supply line 140, respectively, from torch 105. In some embodiments, torch 105 can include additional or secondary orifices from which shield gas or plasma gas can be expelled. Plasma gas supply line pressure sensor 150 is disposed on plasma gas supply line 140. Plasma gas supply line pressure sensor 150 can be located between torch tip 110 and plasma gas supply line valve 145. Torch 105 can be configured to expel shield gas from shield gas supply line 120 and/or plasma gas from plasma gas supply line 140 through torch tip 110, and/or through shield orifice or plasma orifice (not shown) which can be included as part of torch 105. In some embodiments, automated cutting system 100 can include a cutting table (not shown) on which a workpiece can be mounted during a material processing operation, for example a cutting operation.

Automated cutting system 100 includes CNC 160. CNC 160 can relay shield gas supply line valve signal 165 to manipulate shield gas supply line valve 125. Shield gas supply line pressure sensor 130 is capable of relaying shield gas supply line pressure sensor signal 170 to CNC 160, which can indicate measured pressure in shield gas supply line 120. CNC 160 can relay plasma gas supply line valve signal 175 to manipulate plasma gas supply line valve 145. Plasma gas supply line pressure sensor 150 is capable of relaying plasma gas supply line pressure sensor signal 180 to CNC 160, which reflects or is indicative of measured pressure in plasma gas supply line 140. In some embodiments, shield gas supply line pressure sensor 130 and/or plasma gas supply line pressure sensor 150 can be other types of sensors, for example a flow sensor. CNC 160 can be capable of sending and receiving other types of signals to various components of automated cutting system 100. For example, CNC 160 can control torch 105 of automated cutting system 100 to cause torch 105 to trace over a cutting table, or can send signals to drive motors operable to move a torch or a table of an automated cutting system such that the torch is traced over a workpiece. In some embodiments, a power supply can be included as part of automated cutting system 100, which can be capable of sending and receiving signals in a manner similar to CNC 160. Shield gas supply line valve signal 165, shield gas supply line pressure sensor signal 170, plasma gas supply line valve signal 175, and/or plasma gas supply line pressure sensor signal 180 can be communicated to CNC 160 via a network, for example a deterministic network. CNC 160 can plot position, for example position of torch 105, over time.

In some embodiments, automated cutting system 100 can be operated to identify edge 186 of workpiece 185 using plasma gas supply line pressure sensor 150 and shield gas from shield gas supply line 120. In some embodiments, automated cutting system 100 can be, for example, a HyPerformance plasma cutting system HPR400XD (available from Hypertherm, Inc.). Torch 105 can be positioned over workpiece 185 at standoff distance 190. Standoff distance 190 can be defined by the distance between torch tip 110 and workpiece 185, and can be, for example, 0.11 inches, 0.08 inches, or 0.05 inches. In some embodiments, the pressure measurement from plasma gas supply line pressure sensor 150 and/or plasma gas supply line pressure sensor signal 180 can be used for controlling the distance, for example standoff distance 190, between torch tip 110 and workpiece 185.

In accordance with the systems and methods described herein to identify edge 186 of workpiece 185, in some embodiments, plasma gas supply line valve 145 is closed to stop the flow of plasma gas through plasma gas supply line 140 such that no plasma gas reaches plasma gas supply line pressure sensor 150. Shield gas supply line valve 125 is opened to permit shield gas to flow through shield gas supply line 120 and be expelled from torch tip 110. Plasma gas supply line valve 145 and shield gas supply line valve 125 can be manipulated by receiving plasma gas supply line valve signal 175 and shield gas supply line valve signal 165, respectively, from CNC 160. In some embodiments, shield gas supply line 120 can be configured to provide shield gas at a pressure of approximately 50 psi off-valve and a rate of 300 SCFH through shield gas supply line valve 125, while maintaining plasma gas supply line valve 145 in a closed position. During a cutting operation, plasma gas supply line pressure sensor 150 can be used to control the plasma gas flow rate.

In some embodiments, when torch tip 110 is in proximity of workpiece 185 and plasma gas supply line valve 145 is in a closed position while shield gas supply line valve 125 is in an open position, plasma gas supply line pressure sensor 150 will read a back pressure due to stagnation of the flow of shield gas from shield gas supply line 120 through torch tip 110 as the shield gas comes into contact with workpiece 185. As shield gas is flowed from shield gas supply line 120 through torch tip 110, plasma gas supply line pressure sensor 150 will measure a higher back pressure when torch tip 110 is closer to workpiece 185, for example when standoff distance 190 is smaller, than when torch tip 110 is farther away from workpiece 185, for example when standoff distance 190 is larger. When torch 105 is not over workpiece 185, shield gas from shield gas supply line 120 is freely expelled to the atmosphere through torch tip 110 and the back pressure sensed by plasma gas supply line pressure sensor 150 will decrease, approaching zero. The position of torch 105 of automated cutting system 100 can be changed with, for example, one or more motion drives, which can be controlled by CNC 160. Plasma gas supply line pressure sensor 150 measures pressure which is relayed via plasma gas supply line pressure sensor signal 180 to CNC 160. Fluctuations in the pressure measured by plasma gas supply line pressure sensor 150 when torch 105 is located at different positions over a cutting table of an automated cutting system 100 can be used to sense or identify edge 186 of workpiece 185. In some embodiments, changes in the pressure measured by plasma gas supply line pressure sensor 150 can be used to detect or identify a plurality of edges, for example all edges, of a workpiece or plate. In some embodiments, changes in measured pressure can be used to detect or identify other features of workpiece 185, for example holes or defects, or debris on workpiece 185. Pressure or gas volume extrapolation between torch tip 110 and plasma gas supply line pressure sensor 150 can be used to improve the accuracy of identification of edge 186 of workpiece 185 by compensating for a pressure drop or a volume of gas between torch tip 110 and plasma gas supply line pressure sensor 150.

In some embodiments, it can be advantageous for automated cutting system 100 to permit for a scrap clearance 188 from edge 186 of workpiece 185. Scrap clearance 188 can be a predefined value, for example 2 inches, that can be used to determine a working area of workpiece 185 with reference to an edge 186 of workpiece 185. In some embodiments, scrap clearance 188 can be less than 2 inches and can be minimized to increase the amount of material of workpiece 185 that can be used. Scrap clearance 188 can ensure that torch 105 of automated cutting system 100 does not cut off or beyond edge 186 of workpiece 185 during a cutting operation. Torch 105 cutting beyond edge 186 can result in ramp-down errors that negatively impact the life of a consumable used with torch 105 and/or can result in defective parts or parts that are only partially cut, which can generate undesired amounts of waste material.

In some embodiments, CNC 160 can be another type of digital signal processor, such as a computing device, microprocessor, or a programmable logic controller. In some embodiments, shield gas supply line pressure sensor signal 170 or plasma gas supply line pressure sensor signal 180, relaying pressure measured by shield gas supply line pressure sensor 130 or plasma gas supply line pressure sensor 150, respectively, can be transmitted through a network which can be part of the digital signal processor. The data can then be synchronized with and processed by CNC 160.

In some embodiments, other means of communication, for example a deterministic network, can be used to carry the signals. The network of an automated cutting system, for example automated cutting system 100, can be made more efficient if a deterministic network is used, wherein each component's access, for example shield gas supply line pressure sensor 130, plasma gas supply line pressure sensor 150, is controlled for transmitting and/or receiving data. Deterministic-based access methods allow for reliable, time-critical, and high speed network access. Reliable and high-speed network access based on deterministic network protocols can allow for the distribution of system control from the CNC to each component, wherein each node via their own processing unit becomes "intelligent." The deterministic communication network can allow for real-time control, for example feedback control, in response to feedback from the various components of an automated cutting system. The deterministic network can include, for example, a ring network, a star network, or a mesh network. The various components of an automated cutting system, for example automated cutting system 100, can be connected to the deterministic network. For example, all or some of CNC 160, a power source (not shown), shield gas supply line valve 125, shield gas supply line pressure sensor 130, plasma gas supply line valve 145, plasma gas supply line pressure sensor 150, and/or motion drive components (not shown), can be connected to the deterministic network. The deterministic network can transmit data over wire or fiber optic cable, or can be a wireless network. The high-speed deterministic network can include, for example, SERCOS, FIREWIRE, ModBus Communication protocol, or EtherCAT. EtherCAT communication can enable high data rate and sampling ability. These features can enable improved resolution, for example, more measurements per unit area, than possible with previously-used means of communication. These features can offer improved correlation properties, for example by providing real-time data enabling accurate pairing of a measured pressure and the location (X-Y positioning) of the cutting head at the time a pressure sensor measures a change, such that an edge of a workpiece can be more precisely detected. In some embodiments, the deterministic network, such as an EtherCAT network, can enable a wide range of sample rates, for example less than 250 ms, or 10 ms, or 1 ms. In some embodiments, faster data sampling rates, for example 10 ms or 1 ms, can enable improved accuracy of edge detection by ensuring that all of the components of automated cutting system 100 share a common time base. For example, a deterministic network enabling a common time base can allow for the position of torch 105 at a given time to be matched with the same, common time that a sensor, for example, plasma gas supply line pressure sensor 150, measures a change in pressure, allowing for correlation between the position and the edge.

A deterministic network can be implemented using software, hardware, or a combination thereof. A software implementation can be, for example, a network adapted to use a signal, for example a token, that notifies a component when it can send and/or receive data. A hardware implementation can be, for example, a network wherein each component's interface to the transmission medium is adapted to transmit and/or receive data at predetermined times. Hardware implementation of a deterministic-based network can be combined with software to enhance the integration of an automated cutting system's components. In some embodiments, the deterministic network, such as an EtherCAT network, can enable a wide range of sample rates, for example less than 250 ms, or 10 ms, or 1 ms. In some embodiments, the deterministic network can sample each component or data source less frequently than the fundamental rate of the network as implemented in an automated en ting system, for example automated cutting system 100.

Figure 2:
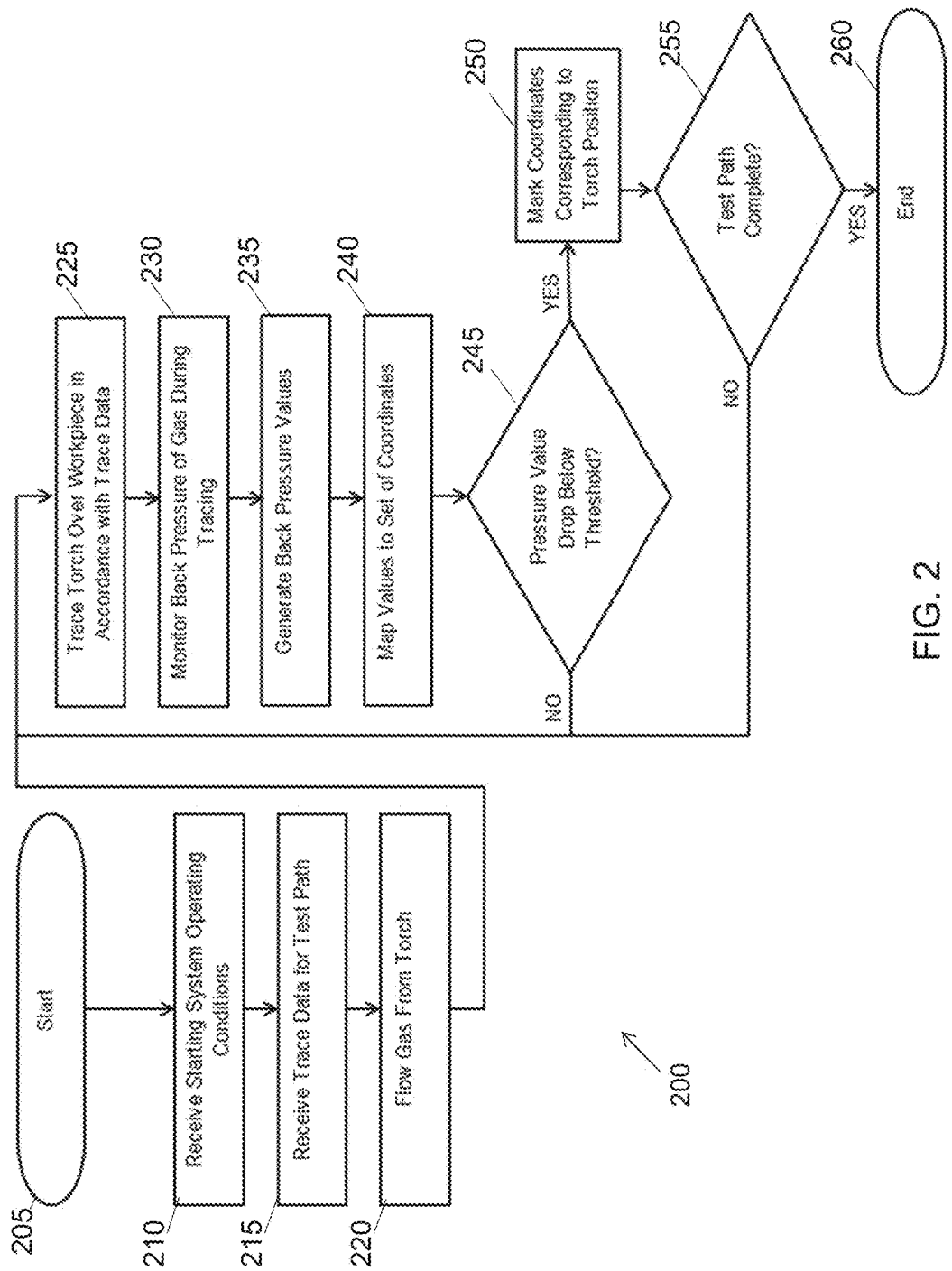
FIG. 2 is a flow diagram depicting a method for identifying edges of a workpiece, in accordance with an embodiment of the invention.

FIG. 2 is a flow diagram depicting a method 200 for identifying edges of a workpiece, in accordance with an embodiment of the invention. The method 200 for identifying edges of a workpiece can be implemented with, for example, automated cutting system 100. Upon initialization (step 205), the method includes receiving current system operating conditions (step 210). System operating conditions can include, for example, the current set point and the geometry of torch consumables. The method includes receiving trace data for a test path (step 215). In some embodiments, the method includes the automated cutting system receiving trace data for a test path. In some embodiments, the method includes providing a computing device with the trace data for a test path. The automated cutting system can use the trace data to control the torch along the test path over the workpiece. The test path can vary depending on the application. In some embodiments, the test path is first established by ensuring that the torch is over the workpiece. This can be visually confirmed by an operator. In some embodiments, the test path is defined by a number of edge test points, which can be points where the pressure measured by, for example, plasma gas supply line pressure sensor 150, drops below a certain threshold value. In some embodiments, the required number of edge test points can depend on the geometry and/or position of the workpiece. For example, to determine the size of a rectangular workpiece, three or four edge test points may be used. After an edge test point is identified, for example in step 250, the trace data can define the test path by moving the torch in an X-Y direction away from the identified edge back over the workpiece. In some embodiments, the test path can be a predefined path along which the torch is traced, which can be designed to enable complete mapping or coverage of the workpiece or of the entire surface of a table of an automated cutting system. The method can include flowing gas from the torch (step 220). The gas can be, for example, shield gas expelled from shield gas supply line 120 through torch tip 110. The method includes tracing the torch over the workpiece in accordance with the trace data (step 225). In some embodiments, the method includes controlling the torch in accordance with the trace data to trace the test path over the workpiece, for example with CNC 160 or a computing device.

The method includes monitoring the back pressure of the gas during tracing (step 230) and generating back pressure values (step 235). The back pressure of the flowing gas can be measured as part of controlling the torch in accordance with the trace data to trace the test path over the workpiece. The back pressure values can be obtained with reference to the monitored back pressure of the gas. In some embodiments, the back pressure can be measured or monitored by a pressure sensor capable of relaying a signal to a digital signal processor, for example CNC 160 or a computing device. The digital signal processor can convert or compile the back pressure monitored by the sensor into a set of back pressure values. A set of back pressure values can be obtained by the digital signal processor generating back pressure values based on the back pressure measured by the sensor. In some embodiments, the signal can be communicated using a deterministic network, which can be included as part of the computing device, for example, an EtherCAT network, which allows for a high sample rate. In some embodiments, the sample rate of the deterministic network can be 50 ms. In some embodiments, the sample rate can be 10 ms, or 1 ms.

The method can include mapping the back pressure values to a set of coordinates (step 240). In some embodiments, the set of coordinates can represent positions on a table of an automated cutting system or can represent positions on a workpiece. In some embodiments, back pressure values measured during tracing are converted to a set of back pressure values. The back pressure values can be mapped to a set of coordinates. In some embodiments, the back pressure values can be mapped to the set of coordinates by associating the time that a particular back pressure value has been measured with a point on an X-Y coordinate system defining the location of a torch at that particular time.

The embodiments of the method include determining whether a back pressure value drops below a threshold pressure value (step 245) during the tracing. When the back pressure value drops below a certain threshold, the method includes marking or otherwise indicating the coordinates corresponding to the torch position when the back pressure value dropped below the threshold value (step 250). The position marked in step 250 can be used to identify the position of an edge of a workpiece. In some embodiments, the method includes marking the coordinates in a nest, part routine, and/or a CNC. The method can include analyzing a set of back pressure values obtained during tracing and the set of coordinates to obtain a subset of coordinates representing an edge of a workpiece. The analyzing can include determining the subsets of coordinates where the back pressure value dropped below a threshold pressure value. Where the back pressure value is above the threshold, the method proceeds by continuing to trace the torch in the test path over the workpiece in accordance with the trace data, as in step 225. The threshold back pressure value can be predetermined, for example by a user selecting a predefined pressure value corresponding with a monitored pressure and inputting that selection to a control module of an automated cutting system, for example CNC 160 of automated cutting system 100. In some embodiments, the threshold back pressure value can be determined by comparing a back pressure value obtained for a particular location or time to other back pressure values monitored during the trace operation in order to determine whether the back pressure value has decreased.

The method can also include determining whether the test path is complete (step 255). When the test path is complete, the method is concluded (step 260). Where the torch has not yet completed tracing the test path in accordance with the trace data, the method proceeds by continuing to trace the torch over the workpiece in accordance with the trace data (step 225). Determination of whether the test path is complete can be accomplished by, for example, CNC 160, a computer program product, or a computing device. In some embodiments, determining whether the test path is complete includes determining whether the method has identified all edge test points. Where the method has not yet identified all edge test points, the method proceeds by continuing to trace the torch over the workpiece in accordance with the trace data (step 225), for example, by moving the torch in an X-Y direction away from the identified edge back over the workpiece. In some embodiments, when the method is complete, a plurality of edges, for example all edges, of a workpiece have been identified. In some embodiments an overall shape of the workpiece can be inferred using the points at which the pressure value dropped below the threshold value, for example where a plurality of edges are identified. In some embodiments, the position or location of edges identified during the method is used during a cutting operation to define a working area of the workpiece. The working area of the workpiece can be an area within which a cutting operation, for example performed by automated cutting system 100, can perform on the workpiece without cutting over an edge of a workpiece.

In some embodiments, it can be advantageous to define a working area of the workpiece. The working area can allow for a scrap clearance from the edges of a workpiece, to define an area within which the torch of the automated cutting system can safely cut, for example, without cutting over the edge of a workpiece. An edge or a plurality of edge and a scrap clearance can be used to determine the working area of the workpiece. For example, the working area can be identified by marking a subset of coordinates corresponding to a scrap clearance, for example scrap clearance 188, associated with an edge of a workpiece, for example according to step 250. The present invention can aid in the minimization of the scrap clearance by providing more providing more accurate location of workpiece edges than prior art methods.

In some embodiments, accuracy of identifying an edge of a workpiece can be improved by tracing the torch over the workpiece at a lower speed. When the torch is moved at a lower speed, the amount of back pressure values acquired over a given length or area is increased as compared with when the torch is moved at a higher rate of speed. As a result of the increase in measured back pressure data and corresponding back pressure values, an automated cutting system can more accurately pinpoint the precise location of the edge of a workpiece. In some embodiments, the approximate position of an edge can be determined by initially tracing over the workpiece with the torch at a first, comparatively higher rate of speed, for example in the range of 200 to 300 inches per minute. Then, a second pass of the workpiece or section of the workpiece, for example limited to the approximate position identified in the first pass, can be performed at a second, comparatively slower rate of speed than the first pass, for example at a speed of 10 to 50 inches per minute. A higher spatial resolution can be obtained using a lower torch speed which, can allow for more accurate identification of the location of an edge of a workpiece. In some embodiments, the resolution of the slower tracing speed can be further improved due to high sample rates made possible by a high-speed deterministic network such as an EtherCAT interface as described above. The tracing speed can dictate or be dependent upon the amount of a scrap clearance from the edge of the workpiece that is required or desired for a certain cutting operation. For example, where a slower tracing speed is used, a smaller scrap clearance can be required as compared to where a higher tracing speed is used.

The signals used in the methods and systems described herein are not limited to the pressure signal. For example, in some applications, the methods and systems can use the flow signal, and/or other signals such as the duty cycle of the control valve PWM signal, low current, marking current, arc transfer loss signals, and arc voltage. Systems in accordance with some embodiments can be configured to monitor a signal from a sensor other than a plasma gas pressure sensor, for example a shield gas pressure sensor, or from another component, map such signal to a set of coordinates corresponding to the table of an automated cutting system or to a workpiece during the tracing of a torch, and analyze the signal to determine the location of the edges of a workpiece.

The methods and systems described herein can be implemented on digital electronic circuitry, or in computer hardware, firmware, software, or in combinations thereof. The implementation can be as a computer program, for example a computer program product which can be embodied in an information carrier, for example a non-transitory, computer-readable storage device, or in a propagated signal, for execution by, or to control the operation of, a data processing apparatus, for example a programmable processor, a computer, or multiple computers. A computer program can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Method steps can be performed by one or more programmable processors executing a computer program, for example a computer program product, to perform functions of the invention by operating on input data and generating output. Method steps can also be performed by, and apparatus can be implemented as, special purpose logic circuitry, for example, an FPGA (field programmable gate array) or an ASIC (application specific integrated circuit). Modules can refer to portions of the computer program and/or the processor/special circuitry that implements that functionality.

FIG. 3 is a chart 300 depicting representative pressure data measured by an automated cutting system practicing the invention, in proximity of an edge of a workpiece, in accordance with an embodiment of the invention. For example, the data illustrated by chart 300 in FIG. 3 can be pressure measurements made by plasma gas supply line pressure sensor 150 and relayed to CNC 160 via plasma gas supply line pressure sensor signal 180, which CNC 160 or a computer program product can use to generate or convert to pressure values. At time zero of FIG. 3, the torch is located at a position above a workpiece, for example workpiece 185. As time progresses in FIG. 3, the torch is traced over the workpiece at a speed of 250 inches per minute toward an edge, for example edge 186 of workpiece 185. When the torch is traced off of the edge of the workpiece, the back pressure measured by the plasma gas pressure sensor decreases, approaching zero. As depicted in FIG. 3, representative pressure data during tracing is provided for a standoff distance of 0.08 inches 310, a standoff distance of 0.11 inches 320, and a standoff distance of 0.05 inches 330. Other standoff distances may be used in accordance with the invention. It can be seen from FIG. 3 that the value of the measured back pressure is larger when the torch is positioned in closer proximity to the workpiece. For example, the hack pressure measured by plasma gas supply line pressure sensor 150 increases with decreasing standoff distance 190. In some embodiments, a smaller standoff distance can be chosen to provide a greater difference between maximum and minimum measured back pressure as the torch is traced over and off of the edge of the workpiece. This phenomenon can be demonstrated by considering the data representing the smallest standoff distance 330 with the data representing longer standoff distances 310 and/or 320. The smallest standoff distance of the representative data corresponds to the highest back pressure measurement and back pressure values of the representative data.

In some embodiments, an edge of the workpiece can be determined with reference to pressure measurements of values corresponding to the downward slope portion depicted in FIG. 3. For example, a digital signal processor, for example CNC 160 or another computing device, or a computer program product, can interpret the measured pressure or pressure values as indicating the position of an edge of a piece at the start of the downslope, for example at the earliest point the downslope is recognized, at the conclusion of the downslope, for example when the measured pressure or pressure values level off to remain constant or when the measured pressure or pressure values approach zero, or at some other point along the downslope. The point along curves 310, 320, or 330 at which a system or method according to the invention can recognize as the position of an edge can be optimized to most accurately reflect the position of the workpiece edge on a cutting table of an automated cutting system.

While the invention has been particularly shown and described with reference to specific preferred embodiments, it should be understood by those skilled in the art that various changes in form and detail may be made without departing from the spirit and scope of the invention as defined by the appended claims.

What is claimed is:

1. A computer program product, tangibly embodied in a non-transitory, computer-readable storage device, for identifying an edge of a workpiece, the computer program product including instructions operable to cause an automated cutting system to:
   receive trace data for a test path to be traced over the workpiece;
   flow a gas from a torch of the automated cutting system;
   control the torch in accordance with the trace data to trace the test path over the workpiece;
   obtain a set of back pressure values by monitoring a back pressure of the gas during the tracing of the path;
   map the set of back pressure values to a set of coordinates; and
   identify an edge of the workpiece using the set of back pressure values and the set of coordinates.

2. The computer program product of claim 1 wherein the gas comprises air.

3. The computer program product of claim 1 wherein the gas is expelled from a shield line.

4. The computer program product of claim 3 wherein the gas comprises air.

5. The computer program product of claim 1 wherein the back pressure is monitored by a pressure sensor on a plasma gas supply line.

6. The computer program product of claim 1 wherein the set of back pressure values and the set of coordinates are used to identify a plurality of edges.

7. The computer program product of claim 6 wherein the plurality of edges of the workpiece and a scrap clearance are used to determine a working area of the workpiece.

8. The computer program product of claim 7 wherein the scrap clearance is less than or equal to 2 inches.

9. A computer-implemented method for finding an edge of a workpiece with an automated cutting system, comprising:
   providing a computing device with trace data for a test path to be traced over the workpiece;
   flowing a gas from a torch of the automated cutting system;
   controlling the torch in accordance with the trace data to trace the test path over the workpiece;
      wherein the controlling includes measuring a back pressure of the flowing gas during the tracing;
   converting the measured back pressure into a set of back pressure values;
   mapping the set of back pressure values to a set of coordinates; and
   analyzing the set of back pressure values and the set of coordinates to obtain a subset of coordinates representing an edge of the workpiece.

10. The method of claim 9 wherein the gas comprises air.

11. The method of claim 9 wherein the gas is expelled from a shield line.

12. The method of claim 11 wherein the gas comprises air.

13. The method of claim 9 wherein the back pressure is measured by a pressure sensor on a plasma gas supply line.

14. The method of claim 9 wherein the computing device comprises a deterministic network.

15. The method of claim 14 wherein the deterministic network comprises an EtherCAT interface.

16. The method of claim 9 wherein the set of back pressure values and the set of coordinates are used to identify a plurality of edges.

17. The method of claim 16 further comprising defining a working area of the workpiece with reference to the plurality of edges and a scrap clearance.

18. The method of claim 17 wherein the scrap clearance is less than or equal to 2 inches.

* * * * *